United States Patent
Krasnov et al.

[11] 3,828,788
[45] Aug. 13, 1974

[54] LASER OPTHALMOSCOPE

[76] Inventors: Mikhail Mikhailovich Krasnov, ulitsa Usievicha 11, kv. 83; Mitrofan Fedorovich Stelmakh, Universitetsky Prospekt, 5, kv. 528; Boris Nikolaevich Malyshev, ulitsa Butlerova 24, kv. 219; Vladimir Nikolaevich Prozorov, Varshavskoe shosse, 87, kv. 89; Pavel Ivanovich Saprykin, ulitsa Narodnogo Opolchenia 44 Korpus 1, kv. 12; Maria Grigorievna Batrukova, ulitsa Novatorov, 18, korpus 2 kv. 3, all of Moscow, U.S.S.R.

[22] Filed: Nov. 24, 1972

[21] Appl. No.: 308,936

[30] Foreign Application Priority Data
Aug. 31, 1972  U.S.S.R............................. 1821987

[52] U.S. Cl. ........................................... 128/303.1
[51] Int. Cl............................................ A61b 17/36
[58] Field of Search............. 128/303 R, 303.1, 395, 128/396; 331/94.5

[56] References Cited
UNITED STATES PATENTS

| | | | |
|---|---|---|---|
| 3,348,547 | 10/1967 | Kavanagh | 128/395 |
| 3,653,384 | 4/1972 | Swope | 128/303.1 |
| 3,703,176 | 11/1972 | Vassiladis et al. | 128/303.1 |
| 3,720,213 | 3/1973 | Hobart et al. | 128/303.1 |

*Primary Examiner*—Lawrence W. Trapp
*Attorney, Agent, or Firm*—Holman & Stern

[57] ABSTRACT

A laser ophthalmoscope is disclosed comprising a pulse laser the radiation of which passes through a light-guide system and an aiming system so as to be directed to the opthalmologic object which is observed with the help of an illumination system. The light-guide system comprises a light-adding means, a mirror and a rotary focusing element which are sequentially mounted along the path of the laser beam and secured on a body hinge-coupled with the mount of the ophthalmoscope. The illumination system comprises a laser source of coherent radiation secured on the same body and operating at a wavelength close to that of the pulse laser. The mirror is mounted so that it can rotate about two orthogonal axes one of which coincides with the direction of the laser beam incident on the mirror; the rotary focusing element can rotate about the axis which coincides with the direction of the laser beam incident on the element, and the laser source of coherent radiation is mounted so that its beam is combined with that of the pulse laser in the light-adding device.

5 Claims, 3 Drawing Figures

LASER OPTHALMOSCOPE

BACKGROUND OF THE INVENTION

The invention relates to ophthalmoscopes and in particular to laser ophthalmoscopes used for treating glaucoma.

It is known in the art to have a laser ophthalmoscope comprising a pulse laser, a light-guide system to apply the laser radiation to the ophthalmologic object, an illumination system for the object, an aiming system to direct the laser radiation at the object and an object observation system.

The known ophthalmoscope uses a laser operating either in the CW-mode or in the uncoupled long-pulse generation mode. The light-guide system of the laser comprises from eight to nine (in different modifications) optical elements (lenses and mirrors). The illumination system uses a filament lamp and from seven to eight optical elements. Due to the fact that the axis of the laser beam coincides with that of the illumination beam passing through these optical elements, four or five of the latter are common for both the light-guide and the illumination system. The beam axes of the ophthalmoscope are made coincident in two ways:

a. in the process of focusing the laser beam onto the center holes in mirrors reflecting the unfocused illumination beam;

b. in the process of narrowing the laser beam with the help of a telescopic system when it is reflected from a mirror placed in the path of the illumination light flux to overshade a portion of the latter.

The eye observation system is monocular and is separated from the laser light-guide and the illumination systems. Its optical axis is inclined at a small angle to the combined axis of the laser and the illumination beams leaving the light-guide system.

The physician treating his pateint's eye has to hold this ophthalmoscope in hand. He aims the laser beam at the ophthalmologic object with the help of the observation system monitoring visually the position of the illumination spot center.

The known laser ophthalmoscope suffers from a number of drawbacks which prevent it from being used for glaucoma treatments, in particular, by means of applying the energy of very large pulses from a Q-switched laser onto an area in the front chamber angle in the eye of a patient having glaucoma with the open angle of the front chamber. This treatment requires that the length of the laser pulse and its peak power should be from $10^{-7}$ to $10^{-8}$ seconds and from $10^6$ to $10^7$ watts, respectively.

The light-guide system of the known laser ophthalmoscope will block the radiation of a Q-switched laser generating very large pulses. This is due, for instance, to the fact that the system contains short focus lenses which converge the laser radiation into spots of a very small diameter. Hence, these spots have high intensities due to the electric field produced by the electromagnetic waves of the focused high-power laser radiation which results in breakdowns (optical breakdowns) of the air in the zone of maximum focusing. The energy of laser radiation in this case is converted into the energy of an electrical discharge.

Besides, the known ophthalmoscope fails to ensure high-accuracy aiming of the laser radiation onto the irradiation object since the laser radiation and the illumination beam spots do not coincide in the process of their being focused on the ophthalmologic object. The non-coincidence is attributed to the fact that the laser and the illumination beams disperse at the common light refraction optical elements of the laser beam light-guide system as well as in the transparent media of the eye. In addition, this non-coincidence between the spots of the laser beam and the illumination light is caused by the fact that the illumination system uses a filament lamp which is a non-coherent light source and hence, the diameter of the illumination spot exceeds, by a number of times, that of the laser beam.

The fact that the known ophthalmoscope uses many optical elements in the path of the laser beam, although they have antireflection coatings, results in the laser radiation being scattered (which is caued, for instance, by reflections from the refracting surfaces of lenses with antireflection coatings and from lens material defects) to produce a halo around the spot of the unscattered laser beam focused at the object to be irradiated. If the known ophthalmoscope uses very large laser pulses the amount of scattered laser energy and the density of the latter in the halo will rapidly grow in the course of operation due to the accelerated pace of damage inflicted by the high power radiation upon quite a number of surfaces of the optical elements in the light-guide system. The optical surfaces in the known light-guide system are also damaged by the Fresnel reflection of the power laser radiation from the concave surfaces of negative lenses in the system which produce the effect on the radiation similar to that of concave focusing mirrors. Besides, the focal point of such a spherical surface may, in this case, happen to be at an optical element.

The halo around the spot of the focused unscattered laser radiation occuring at the irradiation object causes injury to healthy tissues which are not to be irradiated.

The known ophthalmoscope is not provided with an irradiation dose monitor. The observation system in it is monocular which is quite inconvenient in operation and does not protect the eyes of the physician from injuries which can be caused by the laser radiation reflected from the eye tissues of the patient. The aiming of the laser radiation at the object to be irradiated which in this case is performed by the physician manually while he holds the ophthalmoscope in his hand, does not ensure the accuracy required for the purpose of glaucoma treatment since it is impossible to adjust the position of the ophthalmoscope smoothly without jerks and jars and to fix it in its required position.

SUMMARY OF THE INVENTION

The purpose of the present invention is to provide a laser ophthalmoscope which would efficiently transmit very large pulses of laser radiation, exclude haloes around the spots of the laser radiation focused at the object to be irradiated, and ensure accurate aiming and fixed spatial positioning of the laser beam at the object to be irradiated, so that this ophthalmoscope could be used for glaucoma treatment.

This object is achieved in a laser ophthalmoscope which comprises a pulse laser whose emission is directed, via a light-guide system and an aiming system, to the ophthalmologic object illuminated by an illumination system and observed by the physician through the observation system and in which, according to the invention, the guide-light system comprises a light-adding means, a mirror and a rotary focusing element, all these elements being sequentially arranged in the laser beam path and mounted on a body hinge-coupled with the mount of the ophthalmoscope, while the illumination system comprises a laser source of coherent radiation mounted on the same body and operating at a wavelength close to that of the pulse laser radiation, while the mirror is mounted so that it can rotate about two arthogonal axes one of which coincides with the direction of the laser beam incident onto the mirror, the rotary focusing element being mounted so that it can rotate about the axis coincident with the direction of the laser beam incident onto the element and the laser source of coherent radiation being mounted so that its beam is combined with that of the pulse laser in the light-adding means.

It is expedient that the functions of a laser source of coherent illumination radiation should be performed by a gas laser.

It is also feasible that these functions could be performed by a semiconductor laser.

It is preferable that the functions of the light-adding means should be performed by a prism having two plane-parallel refracting facets and one oblique facet having a mirror coating, forming with one of the plane-parallel facets, an angle equal to that at which the beam of the laser illumination source is refracted at that facet having a mirror coating.

It is also expedient that the rotary focusing element should be made as a trihedron prism with one facet facing the laser beam incident onto the prism being spherical and the other two being plane.

The laser ophthalmoscope designed according to the present invention ensures that the very large pulses of a Q-switched pulsed laser are efficiently transmitted to the ophthalmologic object without producing a halo around the spot of the focused laser radiation that may be quite dangerous to the patient and also ensures that the aiming of the very large pulses is performed with a high degree of accuracy. The arrangement of the optical elements that form the light-guide and the illumination systems on the body hinge-coupled with the mount of the ophthalmoscope makes it possible to aim the radiation onto the target spot of the ophthalmologic object in a smooth way and to accurately fix the selected direction of the beam.

The above advantages of the ophthalmoscope according to the present invention make it possible to use it for treating glaucoma pateints with very large laser pulses.

The present laser ophthalmoscope can also be efficiently used to treat glaucoma patients with the laser either being a CW-laser or a pulse laser operating in the uncoupled mode.

BRIEF DESCRIPTION OF THE DRAWINGS

The invention will now be described by way of example with particular reference to the accompanying drawings, in which.

DETAILED DESCRIPTION OF A PREFERRED EMBODIMENT

Figure 1:
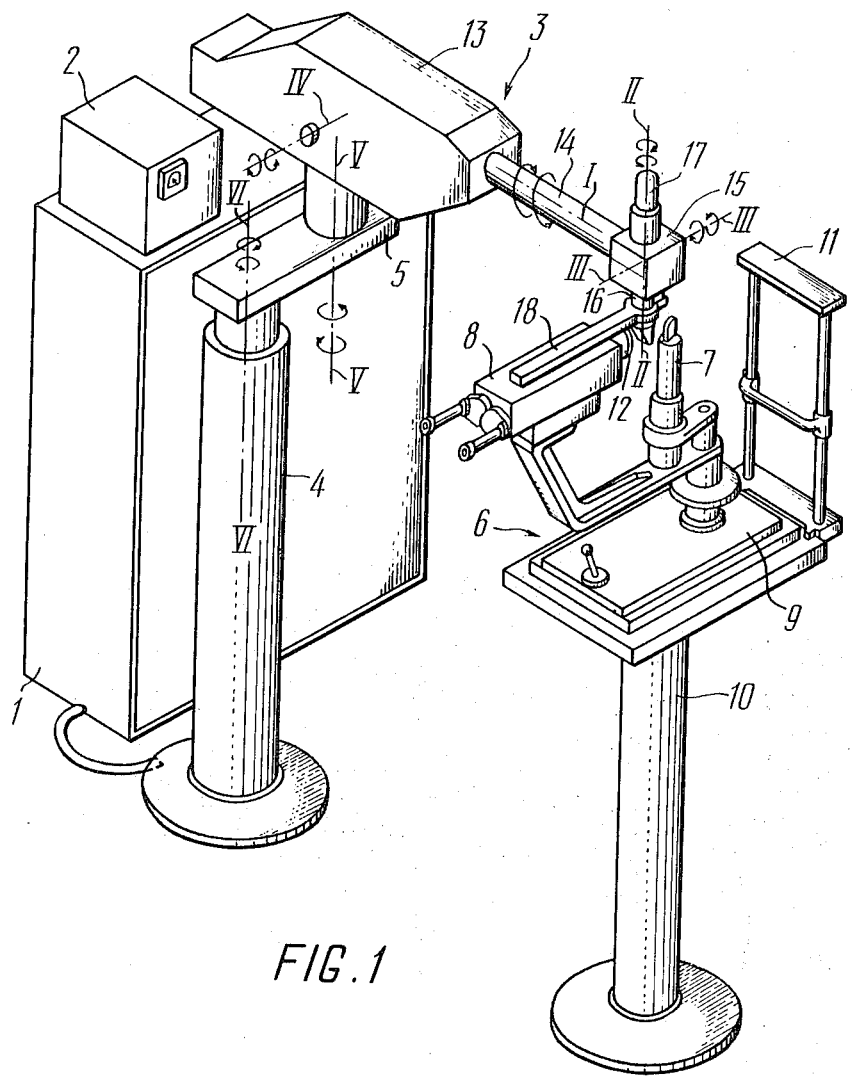
FIG. 1 presents a general view of the laser ophthalmoscope, according to the invention.

The laser ophthalmoscope presented in FIG. 1 comprises a power supply 1 with a control panel 2, a radiator 3 coupled with the mount 4 of the ophthalmoscope by means of a leverage 5 and a slit lamp assembly 6 intended for the microscopic observation of the living eye. The slit lamp assembly 6 comprises an illuminator 7, a binocular microscope 8, a compound table 9, a support table 10 and a patient's face frame 11. Mounted in front of the inlet lens of the objective of the microscope 8 is a shutter 12.

The radiator 3 comprises the following structural elements: a body 13 with an inlet pipe 14, a rotation head 15 with an outlet pipe 16, a condenser system 17 and a bracket 18.

Figure 2:
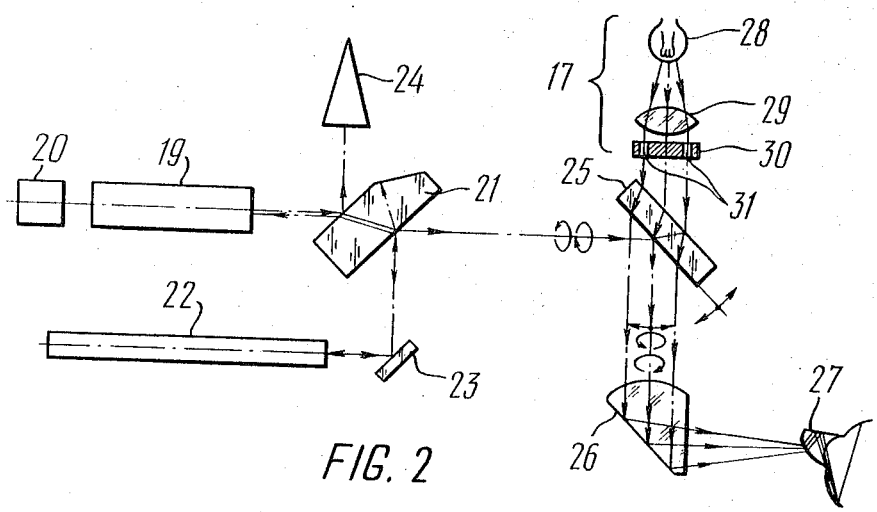
FIG. 2 shows the optical arrangement of the ophthalmoscope, according to the invention.

The optical arrangement of the radiator 3 is shown in FIG. 2. It comprises a solid state laser 19, a Q-switch 20, a light-adding device 21, a laser source 22 of coherent radiation with a rotary mirror 23, a calorimeter 24, a movable mirror 25, a rotray focusing element 26, a condenser system 17 and a gonioscope 27.

The condenser system 17 comprises a filament lamp 28, a lens 29, a membrane 30 having two holes 31 made at the edges of the membrane 30 along its diameter and symmetrically with respect to its center.

The functions of the source 22 of coherent radiation in the present embodiment of the invention are performed by a gas laser operating at a wavelength close to that of the pulse solid-state laser 19. It is also feasible that these functions could be performed by a semiconductor laser.

The light-adding device 21 is made as a prism having two light-refracting plane-parallel facets and one oblique facet which, together with one of the plane-parallel facets, forms an angle equal to that at which the beam of the laser source 22 of coherent radiation is refracted at the oblique facet. The oblique facet has a highly reflecting mirror coating (e.g., a silver one).

The light-adding device 21 can also be made as a plane-parallel plate of a transparent dielectric. But the light-adding prism, however, is more efficient since it permits a greater portion of the energy of the laser source 22 of coherent radiation to be aimed in the required direction.

The movable mirror 25 is a glass plane-parallel plate with a dielectric reflecting coating sprayed on the side that receives the incident laser radiation. The maximum of the reflection index of the dielectric coating approaching 100 percent coincides with the wavelength of the solid-state laser 19. The other side of the movable mirror 25, i.e., the side opposite to that with the dielectric coating, may have a metal (silver) reflecting coating with a reflection index of up to 80 percent which provides for additional reflection of the radiation of the gas laser 2. In case there is no condenser system 17 the movable mirror 25 can also be made as an all-metal piece.

The rotary focusing element 26 is a trihedron prism which has one convex spherical facet (along the beam path), one plane reflecting facet and one plane reflecting facet. The reflecting facet of the trihedron prism may have a highly reflecting mirror coating.

The rotary focusing element 26 can also be of a complex design comprising a plane mirror and a focusing lens. The prism version however is preferable since it has fewer surfaces that may be fouled or damaged and diffuses less light.

The optical elements of the radiator 3 described above are arranged in the latter as follows (FIGS. 1 and 2). The solid-state laser 19, the laser illumination source 22, the light-adding device 21, the calorimeter 24 and the rotary mirror 23 are located in the body 13 of the radiator 3. The movable mirror 25 is housed in the rotary head 15 hinge-mounted at the end of the inlet pipe 14 of the radiator 3. The rotary focusing element 26 is rigidly secured to the end of the outlet pipe 16 hinge-mounted in the rotary head 15. The condenser system 17 is rigidly coupled with the outlet pipe 16 of the radiator 3. The rotary head 15 is mounted so that it can turn about the axis I which coincides with the direction of the laser beam incident onto the mirror 25. The outlet pipe 16 is mounted so that it can rotate about two axes: its own axis II of symmetry which coincides with the direction of the laser beam, and the axis III which is orthogonal to the axes I and II. The rotation of the outlet pipe 16 about the axis III is transferred, via a gear assembly (not shown in FIG. 1), to the movable mirror 25 which can rotate about the same axis III but at a rate exactly twice as low. This arrangement serves to center the beams of the solid state laser 19 and the gas laser 22 along the axis of the outlet pipe 16 when it rotates about the axis III.

As shown in FIG. 1, the radiator is coupled with the leverage 5 through the axis of rotation IV. In its turn the leverage 5 has axes of rotation V and VI. The fact that the body 13 of the radiator 3 is coupled with the mount 4 through the axes of rotation IV, V and VI ensures the hinge-coupling of the body 13 with the radiator 3.

Thus, the outlet pipe 16 (FIG. 1) and the rotary focusing element 26 (FIG. 2) rigidly secured to it are coupled with the mount 4 (FIG. 1) through six axes of rotation and, therefore, have 6° of freedom of displacement.

Figure 3:
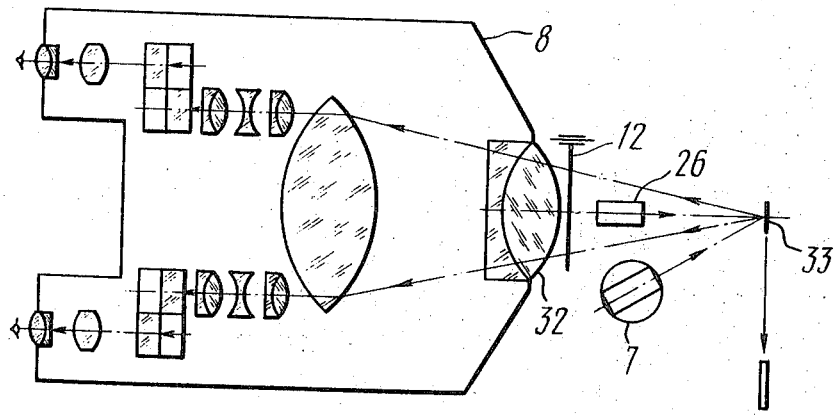
FIG. 3 shows the optical arrangement of the observation system, according to the invention.

FIG. 3 shows the optical arrangement of the ophthlamologic object observation system comprising the bincoular microscope 8 with an outlet lens 32 of the objective, the light protection shutter 12, the rotary focusing element 26, the illuminator 7 of the slit lamp assembly 6 and a plane reflecting screen 33.

As shown in FIG. 1, the outlet pipe 16 is rigidly coupled with the binocular microscope 8 with the help of the bracket 18. Secured on the bracket 18 is the light protection shutter 12. The rotary focusing element 26 of the radiator 3 is mounted at a minimum distance from the outlet lens 32 of the bincoular microscope 8 as it is shown in FIG. 3, but it does not overshade the field of view of the microscope 8. As is evident from FIG. 3, the optical axis of the binocular microscope 8 coincides with those of the laser radiation beams. Also coincident are their focuses. The coincidence between the optical axes and focuses is preserved irrespective of the displacement of the bicnoular microscope 8 on the compound table 9 in both the horizontal and vertical planes due to the fact that the outlet pipe 16 is rigidly secured to the microscope 8 and that the outlet pipe 16 has 6° of freedom of displacement.

Due to the design of the optical arrangement described above and the relationship between the elements the light beams in the ophthalmoscope have the following paths.

The radiation of the solid-state laser 19 having, for instance, a ruby active element, passes through the light-adding device 21. A portion of the radiation (up to 5 percent) is reflected from the first (along the beam path of the laser 19) facet of the device 21 and strikes the calorimeter 24. Then, the laser radiation arrives at the mirror 25 which almost completely reflects the light (the reflection index is close to 100 percent) to the rotary focusing element. The latter deflects the light at 90° and gathers it on the gonioscope 27 applied onto the cornea of the patient's eye. The inlet of the gonioscope 27 has a convex spherical surface serving to additionally focus the laser radiation.

The beam of the gas laser 22 (i.e., a He—Ne laser) is directed by the mirror 22 onto the second (along the beam path of the laser 19) facet of the light-adding device 21 from which one portion of the radiation is reflected while another one is refracted. Here the beam portion that has been reflected from the second facet of the device 21 is directed to the movable mirror 25, while the refracted beam arrives normally to the oblique facet of the light-adding device 21 and is reflected directly in the same direction as the incident refracted beam. After leaving the device 21 the beam goes to the source 22 along the path of the beam that leaves the source 22 and arrives normally to the plane outlet mirror of the source 22.

Since the reflection index of the outlet mirror of the source 22 (the He—Ne laser) and that of the mirror coating on the oblique facet of the light-adding device 21 are rather high and approach 100 percent, the radiation of the source 22 passes from one of these mirror surfaces to the other and back many times. In the course of these multiple reflections from the second (along the beam path of the laser 19) facet of the light-adding means 21 a substantial portion of the radiation is diverted towards the movable mirror 25.

Thus, the beam of radiation from the solid-state laser 19 and the gas laser source 22 are combined in the light-adding device 21.

Then, on being reflected from the mirror 25 the radiation of the source 22 as well as that of the solid-state laser 19 pass through the rotary focusing element 26 to be converged on the gonioscope 27 which provides for the aditional focusing of the light in the interior of the patient's eye.

The light from the filament lamp 28 passes through the condenser lens 29 and arrives at the membrane 30 provided with two holes 31. The light from the lamp 28 passes thorugh the holes 31 in the membrane 30 and the movable glass mirror 25 to be deflected and focused by the rotary focusing element 26. Outside the focus of the rotary focusing element 26 the radiation of the condenser system 17 will be presented as two separate beams which will coincide only in the focus of the element 26. The use of the condenser system 17 in the radiator 3 of the ophthalmoscope facilitates the process of determining and fixing the focusing plane of three beams of light, viz. the two beams generated by the gas laser 22 and the solid-state laser 19 which have different divergence ratios and different diameters, and the image of the light slit in the illuminator 7 of the slit lamp assembly 6.

The laser ophthalmoscope is operated in the following way.

The physician starts by checking the position of the focusing plane. To do this he places a flat reflective screen 33 in front of the microscope 8 (FIGS. 2, 3) of the slit lamp assembly so that the screen is orthogonal to the optical axis of the microscope. Then he turns on the illuminator 7 of the slit lamp and positions it near the microscope and at an angle to the optical axis of the latter. By moving the screen 33 along the optical axis of the microscope 8 the physician obtains a sharp image of the light slit of the illuminator 7 on the screen 33. While viewing the image through the microscope 8 the physician moves the microscope along the optical axis of the latter until the image of the light slit of the illuminator 7 becomes as sharp as possible.

Then the physician turns on the laser source 22 and the filament lamp 28 of the condenser system 17 and moves the bracket 18 along the optical axis of the microscope until the two light slots from the condenser system 17 coincide into one and until the spot of the laser source 22 coincides with the centre of the light slit of the illuminator on the reflective scrren 33. After that the screen 33 is removed.

Using the frame 11 the physician then fixes the position of the patient's head and places the gonioscope 27 on the cornea of his eye. Then he moves the compound table 9 in the horizontal and in the vertical planes to aim the light spot of the laser source 22 at the target area in the patient's eye. In doing this, he monitors the zone to be irradiated through the microscope 8 with the help of the light slit of the illuminator 7 of the slit lamp assembly 6. Having fixed the positions of the spots in the interior of the eye, the physician presses the pedal (not shown in FIGS. 1, 2, 3) thus initiating a command for the control panel 2 of the opthalmoscope, according to which a pulse from the solid-state laser 19 "shoots" into the eye of the patient. Just prior to the shot a drive (not shown in FIGS. 1, 2, 3) will automatically operate the protection shutter 12 which blocks the microscope objective for the duration of the laser pulse. After the shot the shutter is automatically pushed aside to its initial position.

The angle of the front chamber of the eye of a glaucoma patient is treated with pulsed laser radiation in the wavelength range from 4,500 A to 10,600 A at a peak power from 0.1W to $10^7$ W, the duration of laser pulses being from $10^{-8}$ sec to 5 sec. The laser beam for the treatment is focused so as to obtain a spot with a diameter from 0.05 mm to 0.7 mm. One treatment procedure consists of at least five "short." A gas bubble appearing right after the "shot" in the respective area of the front chamber angle of the patient's eye will indicate that the aiming has been accurate and the dose sufficient.

The dose of irradiation is monitored by the calorimeter 24 which is heated by the light beam of the solid-state laser 19 reflected from the first facet of the light-adding means 21. The respective data is registered in a recorder (not shown in FIGS. 1, 2, 3).

Since both the laser source 22 and the solid state laser 19 operate in the same (red) portion of the spectrum the dispersion of the beam produced by combining the radiations of the two lasers is negligibly small. The radiations of the two lasers are highly coherent and they can coincide quite accurately at the point of focusing in the ophthalologic object.

At the same time, the fact that the light-guide system of the solid-state laser uses only three optical elements, viz. the light-adding means 21, the movable mirror 24 and the rotary focusing element 26, and only one spherical surface (in the prism of the rotary focusing element 26) is a secure guaranty from scattered radiation haloes which are dangerous for the patient and which may appear in the interior of his eye in the course of a long-time operation of the ophthalmoscope. Besides, the small number of optical elements makes it possible to transmit the solid-state laser radiation to the irradiation object with a high degree of efficiency.

What is claimed is:

1. A laser ophthalmoscope for irradiating an ophthalmologic object with laser radiation comprising: light-guiding means for optically transferring laser radiation to the ophthalmologic object; an observation means for observing said ophthalmologic object undergoing laser radiation; an aiming means for directing the laser radiation at the ophthalmologic object; an eye illumination means for illuminating the ophthalmologic object; support means having a body member hinge-coupled thereto for rotatable motion thereon; first laser means mounted in said body member for providing a first beam of laser radiation; second laser means mounted in said body member for providing a second beam of coherent radiation having a wavelength substantially equal to the radiation of said first laser means; a light-adding means of said light-guiding, means fixed rigidly in said body member, said light-adding means combining therein said first and second beams of laser radiation and emitting a combined beam of laser radiation therefrom; a mirror of said light-guiding means mounted in the path of said combined beam for reflecting therefrom the incident rays of said combined beam of radiation falling thereon, and being secured to said body member for rotation about two orthogonal axes a first one of which coincides with the directional axis of said combined beam of laser radiation; a rotatable focusing means of said light-guiding means being mounted sequentially after said mirror for receiving the reflected beam of laser radiation from said mirror, said rotatable focusing means being secured to said body member for rotation about a second axis which coincides with the directional axis of the reflected beam from said mirror incident thereon and focusing this reflected beam on the opthalmologic object; and a power supply and a control panel for providing power to and controlling the operations of the opthalmoscope respectively.

2. An opthalmoscope as claimed in claim 1 wherein said second laser means providing coherent radiation is a gas laser.

3. An ophthalmoscope as claimed in claim 1 wherein said second laser means providing coherent radiation is a solid-state laser.

4. An ophthalmoscope as claimed in claim 1 wherein said light-adding means is a prism having two light reflective plane-parallel faces which receive said first and said second beam of laser radiation respectively and one oblique face having a mirror coating, said oblique face, together with that one of said plane-parallel faces which receives said second beam, forming an angle equal to that at which said that one plane-parallel face refracts the coherent radiation of said second beam from said second laser means in said light-adding means.

5. An ophthalmoscope as claimed in claim 1 wherein said rotary focusing means is a trihedron prism having three facets one of said three facets receiving said incident rays and being spherical with the other two of said three facets being plane.

* * * * *